(12) United States Patent
Mao

(10) Patent No.: US 10,562,455 B2
(45) Date of Patent: Feb. 18, 2020

(54) FOOTREST FOR ASSISTING IN TOUCHING CAR ROOF

(71) Applicant: Xufeng Mao, Hubei Province (CN)

(72) Inventor: Xufeng Mao, Hubei Province (CN)

( * ) Notice: Subject to any disclaimer, the term of this patent is extended or adjusted under 35 U.S.C. 154(b) by 0 days.

(21) Appl. No.: 16/188,978

(22) Filed: Nov. 13, 2018

(65) Prior Publication Data

US 2019/0329710 A1 Oct. 31, 2019

(30) Foreign Application Priority Data

Apr. 28, 2018 (CN) .................... 2018 2 0645717 U

(51) Int. Cl.
*B60R 3/00* (2006.01)

(52) U.S. Cl.
CPC .................... *B60R 3/007* (2013.01)

(58) Field of Classification Search
CPC ............ B60R 3/007; B60R 3/02; B60R 3/002
See application file for complete search history.

(56) References Cited

U.S. PATENT DOCUMENTS

| | | | | | |
|---|---|---|---|---|---|
| 2,218,060 A | * | 10/1940 | Watson | ...................... | B60R 3/02 105/447 |
| 3,159,242 A | * | 12/1964 | James | ...................... | B60R 3/007 182/92 |
| 3,357,719 A | * | 12/1967 | McCrea | .................. | B60R 3/007 182/92 |
| 3,734,534 A | * | 5/1973 | Brooks, Jr. | ............. | B60R 3/007 280/163 |
| 4,057,125 A | * | 11/1977 | Kroft | ...................... | B60R 3/007 182/206 |
| 4,203,611 A | * | 5/1980 | Makela | .................. | B60R 3/002 280/163 |
| 4,311,320 A | * | 1/1982 | Waters, Jr. | ............. | B60R 3/002 108/44 |
| D276,716 S | * | 12/1984 | Dignan | ....................... | D12/203 |
| 4,546,993 A | * | 10/1985 | Walker | ..................... | B62J 25/00 182/91 |
| 4,620,609 A | * | 11/1986 | Elsten | ..................... | B60R 3/007 182/92 |
| 4,785,910 A | * | 11/1988 | Tonkovich | ............. | B60R 3/007 182/61 |
| 4,869,520 A | * | 9/1989 | Cole | ....................... | B60R 3/007 280/164.1 |
| 4,911,262 A | * | 3/1990 | Tani | .......................... | F01N 1/02 181/266 |
| 6,471,002 B1 | * | 10/2002 | Weinerman | ............... | B60R 3/02 182/90 |
| 6,511,086 B2 | * | 1/2003 | Schlicht | .................... | B60R 3/02 280/163 |
| 7,121,571 B2 | * | 10/2006 | Savage | .................... | B62J 23/00 280/291 |

(Continued)

*Primary Examiner* — Hau V Phan
(74) *Attorney, Agent, or Firm* — Schmeiser, Olsen & Watts LLP

(57) ABSTRACT

The utility model discloses a footrest for assisting in touching a car roof, the footrest comprises a footplate and a pothook movably connected to the footplate, and the footplate is further provided with a safety hammer head. The footplate comprises a footplate body, the footplate body is provided with a storage cavity, and the pothook is rotatably connected to one end of the storage cavity so as to be stored in the storage cavity.

5 Claims, 3 Drawing Sheets

(56) References Cited

U.S. PATENT DOCUMENTS

| | | | |
|---|---|---|---|
| 7,270,381 B2 * | 9/2007 | Kolpasky | B60B 7/0066 |
| | | | 280/165 |
| D602,416 S * | 10/2009 | Corwin | D12/203 |
| 8,393,629 B2 * | 3/2013 | Wotherspoon | B60R 3/007 |
| | | | 280/163 |
| 2004/0256832 A1 * | 12/2004 | Bradsen | B60R 3/002 |
| | | | 280/163 |
| 2005/0012295 A1 * | 1/2005 | Chevalier | B60R 3/002 |
| | | | 280/163 |
| 2010/0320713 A1 * | 12/2010 | Mann | B60R 3/02 |
| | | | 280/163 |
| 2013/0270791 A1 * | 10/2013 | Anderson | B60R 3/007 |
| | | | 280/163 |

* cited by examiner

FOOTREST FOR ASSISTING IN TOUCHING CAR ROOF

CROSS REFERENCE TO RELATED APPLICATION

This application claims priority from Chinese Patent Application No. 201820645717.5, filed Apr. 28, 2018 and entitled "FOOTREST FOR ASSISTING IN TOUCHING CAR ROOF" the disclosure of which is hereby incorporated entirely herein by reference.

FIELD OF THE INVENTION

The utility model relates to the technical field of vehicle-mounted supplies and in particular relates to a footrest for assisting in touching a car roof.

BACKGROUND OF THE INVENTION

Cars are travelling tools commonly used in the life of modern people and provide great convenience for the life of people. However, the top of a car is away from the ground for a certain distance, and particularly, it is relatively inconvenient to clean the roof or take and place articles stored on the roof of a large car body such as a SUV.

SUMMARY OF THE INVENTION

The utility model aims at providing a footrest for assisting in touching a car roof, which solves the technical problem that it is inconvenient to clean the car roof or take and place articles.

In order to achieve the aim, the utility model proposes the technical solution:

The footrest for assisting in touching the car roof, disclosed by the utility model, comprises a footplate and a pothook movably connected to the footplate, and the footplate is further provided with a safety hammer head.

The footplate comprises a footplate body, the footplate body is provided with a storage cavity, and the pothook is rotatably connected to one end of the storage cavity so as to be stored in the storage cavity.

A threaded hole is further formed in the footplate body, and the safety hammer head is connected to the footplate body by the threaded hole.

The upper surface of the footplate body is further provided with an anti-skid texture.

A through hole is formed in the pothook, a connecting hole corresponding to the through hole is formed in the footplate, and the pothook is connected to the footplate by penetrating a connecting rod into the through hole and the connecting hole.

The edge of the footplate has a silicone sets, which contact with car, in order to prevent from damage of the car door paint.

Compared with the prior art, the footrest for assisting in touching the car roof, disclosed by the utility model, is convenient for a user to tread and easier to touch the car roof to perform operations such as cleaning as well as article taking and placing because the footplate and the pothook which are movably connected form an auxiliary footplate which may be hung on a car door lock catch, and the pothook may be stored in the footplate when not being used, so that the space is saved; and meanwhile, the footplate is additionally provided with the safety hammer head, so that the function is more powerful.

DETAILED DESCRIPTION OF THE INVENTION

The utility model is further described in detail below with reference to the accompanying drawings.

Figure 1:
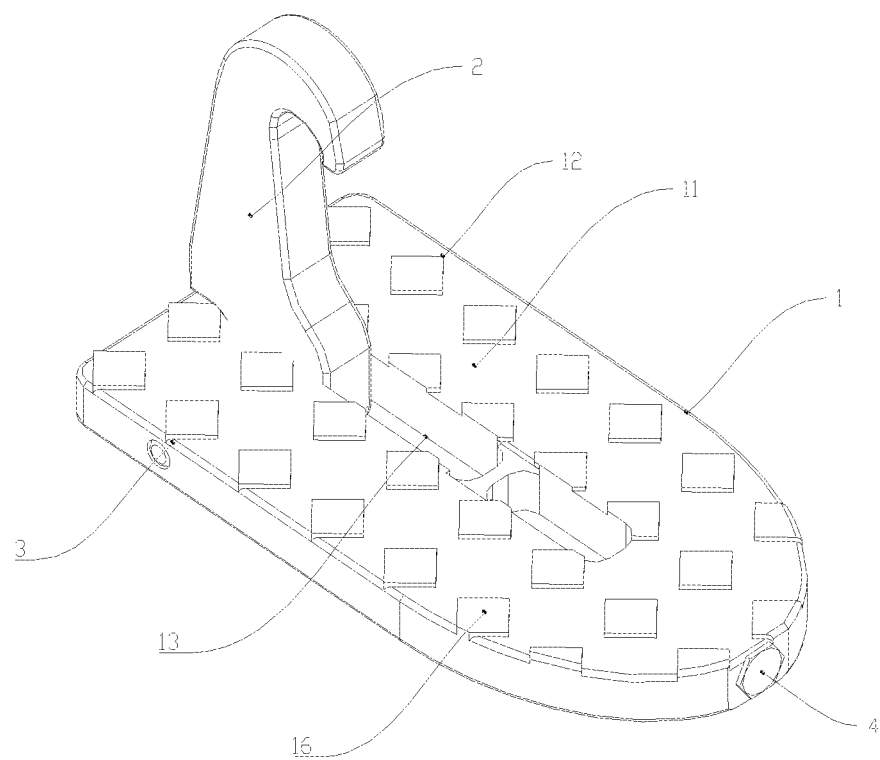
FIG. 1 is a schematic diagram of an overall structure of a footrest for assisting in touching a car roof, disclosed by the utility model.
Figure 2:
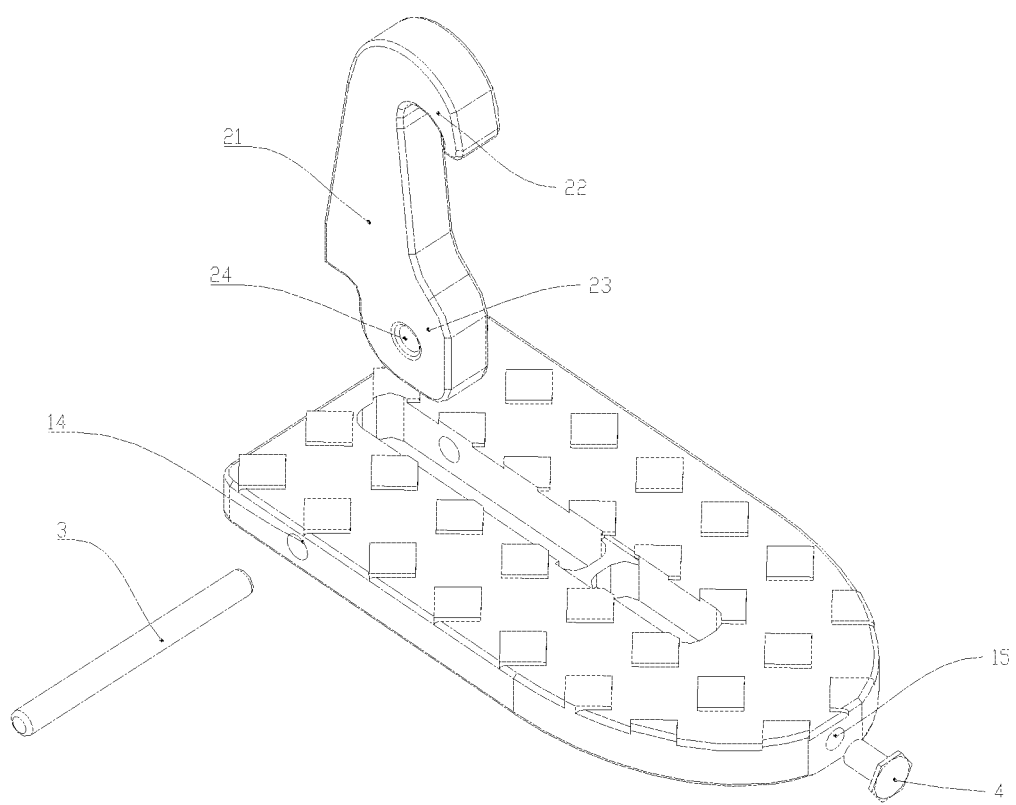
FIG. 2 is an explosive view of the footrest for assisting in touching the car roof, disclosed by the utility model.
Figure 3:
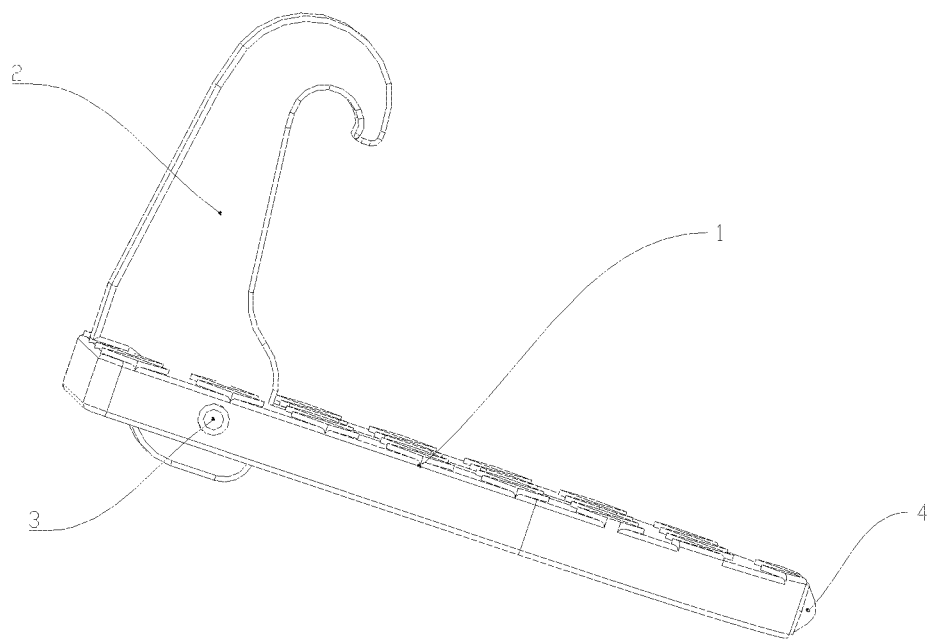
FIG. 3 is a side view of the footrest for assisting in touching the car roof, disclosed by the utility model.

Refer to FIG. 1 to FIG. 3, in the embodiment, the footrest for assisting in touching the car roof comprises a footplate 1 and a pothook 2 movably connected to the footplate 1, and the footplate 1 is further provided with a safety hammer head 4.

More specifically, the footplate comprises a footplate body 11, the footplate body 11 is provided with a storage cavity 13, and the pothook 2 is rotatably connected to one end of the storage cavity 13 so as to be stored in the storage cavity 13. When not being used, the pothook 2 may rotate along with the footplate body 11 to be stored in the storage cavity 13, so that the storage space is saved, and it is convenient to realize storage.

Further, a threaded hole 15 is further formed in the footplate body 11, the safety hammer head 4 is connected to the footplate body 11 by the threaded hole 15, namely the safety hammer head 4 is connected with the footplate body 11 in a threaded way, and in other embodiments, the safety hammer head 4 is connected with the footplate body 11 in a way such as clamping or an integrated structure.

The upper surface of the footplate body 11 is further provided with an anti-skid texture 1 or an anti-skid bulge 16. The anti-skid texture or the anti-skid bulge 16 comprises an anti-skid structure capable of evenly dividing parts of raised blocks, uniform stripes and the like to increase the friction with soles.

Refer to FIG. 2 again, a through hole 24 is formed in the pothook 2, a connecting hole 14 corresponding to the through hole 24 is formed in the footplate 1, and the pothook 2 is connected to the footplate 1 by penetrating a connecting rod 3 into the through hole 24 and the connecting hole 14. The pothook 2 comprises a connecting part 21 as well as a hook part 22 and an adapting part 23 respectively extending out two ends of the connecting part, the through hole 24 is formed in the adapting part 23, the adapting part 23 extends into one end of the storage cavity 13 when being assembled with the footplate 1, and the pothook 2 is connected by the connecting rod 3 to be capable of rotating along the connecting rod 3 so as to be stored in the storage cavity 13.

Of course, it should be explained that the safety hammer head is selectively mounted by a user, it is no problem if the safety hammer head 4 is not assembled, and at this moment, the footrest for assisting in touching the car roof is only used as a footrest. The safety hammer head 4 is preferably connected to the front end of the footplate body 11, which is more beneficial to the stress during use.

Compared with the prior art, the footrest for assisting in touching the car roof, disclosed by the utility model, is convenient for a user to tread and easier to touch the car roof to perform operations such as cleaning as well as article taking and placing because the footplate and the pothook which are movably connected form an auxiliary footplate which may be hung on a car door lock catch, and the pothook may be stored in the footplate when not being used, so that the space is saved; and meanwhile, the footplate is additionally provided with the safety hammer head, so that the function is more powerful.

The above description should not be construed as limitations of the implementation plan of the utility model, but merely as preferred embodiments thereof. Corresponding variations or modifications may be conveniently realized by the ordinary skilled in the art according to the main concept and spirit of the utility model. Hence, the scope of the utility model should be subject to the scope defined in the claims.

The invention claimed is:

1. A footrest for assisting in touching a car roof, comprising:
   a footplate;
   a single pothook hingedly coupled to the footplate, wherein the pothook faces inward toward the footplate, wherein the pothook is rotatable with respect to the footplate between a stored configuration and an open configuration, and wherein the pothook is configured to hang from a car door lock catch; and
   a safety hammer head coupled to the footplate;
   wherein the footplate comprises a storage aperture therethrough for partially receiving the pothook thereinto while the pothook is in the stored configuration.

2. The footrest for assisting in touching the car roof of claim 1, wherein the footplate further comprises:
   a threaded recess therein, wherein the safety hammer head is threaded into the threaded recess.

3. The footrest for assisting in touching the car roof of claim 1, wherein an upper anti-skid texture.

4. The footrest for assisting in touching the car roof of claim 1, further comprising:
   a through hole through the pothook;
   a connecting hole through the footplate, wherein the connecting hole is aligned with the through hole; and
   a connecting rod inserted into the through hole and the connecting hole for hingedly coupling the pothook to the footrest.

5. The footrest for assisting in touching the car roof of claim 1, further comprising:
   at least one silicone set coupled to an edge of the footplate for preventing damage to a car from contact of the footplate with the car.

\* \* \* \* \*